United States Patent [19]

Kawashima et al.

[11] 3,939,489
[45] Feb. 17, 1976

[54] RECORDING AND REPRODUCING APPARATUS

[75] Inventors: Norifumi Kawashima, Chigasaki; Kiyokazu Kamijima, Tachikawa; Yoshiaki Yakeuchi, Ichikawa, all of Japan

[73] Assignee: Sony Corporation, Tokyo, Japan

[22] Filed: Aug. 26, 1974

[21] Appl. No.: 500,257

[30] Foreign Application Priority Data
Aug. 30, 1973 Japan............................. 48-101822

[52] U.S. Cl..................................... 360/13; 360/68
[51] Int. Cl.².................................... G11B 27/02
[58] Field of Search.............. 360/61, 63, 68, 13, 24

[56] References Cited
UNITED STATES PATENTS
3,604,858  9/1971  Doi........................................ 360/13
3,831,190  8/1974  Werb..................................... 360/13

*Primary Examiner*—Vincent P. Canney
*Attorney, Agent, or Firm*—Lewis H. Eslinger; Alvin Sinderbrand

[57] ABSTRACT

Recording and reproducing apparatus is disclosed wherein stereo signal components which include a monaural signal component are supplied to a signal processing circuit. The signal processing circuit replaces the supplied monaural signal component with a further monaural signal component. The thus processed stereo signal components, including the further monaural signal component, are supplied to a first recording head for recording on a medium. The supplied stereo signal components including the supplied monaural signal component are coupled to a second recording head for recording on the medium. The recorded stereo signal components including the further monaural signal component and the recorded stereo signal components including the supplied monaural signal component are reproduced from the medium and sounds corresponding to the reproduced signals are generated. The reproduced sounds thus include the stereo signal components, the further monaural signal component and the supplied monaural signal component so that both monaural signal components can be audibly compared. In one embodiment, reproduction of the supplied monaural signal component can be supressed, whereby the generated sounds represent the further monaural signal component in combination with the supplied stereo components.

20 Claims, 1 Drawing Figure

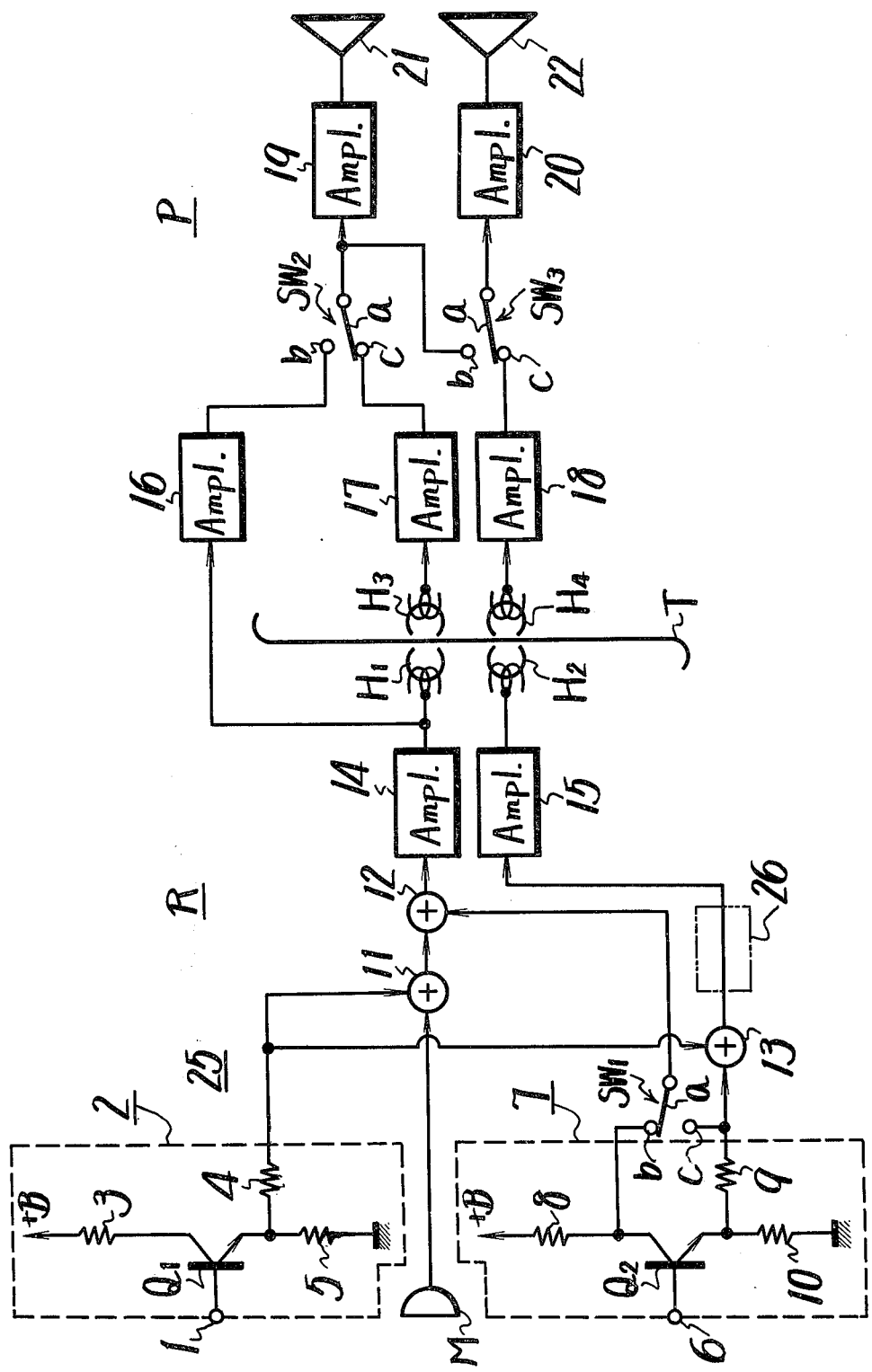

RECORDING AND REPRODUCING APPARATUS

BACKGROUND OF THE INVENTION

This invention relates to recording and reproducing apparatus and, in particular, to such apparatus wherein an original speech signal can be replaced by a further speech signal to thereby perform the so-called voice-changing function.

Sound reproduction apparatus, known as a "voice changer," is known whereby prerecorded signals, such as stereophonic music signals, are processed to replace a particular prerecorded signal with a further signal.

This apparatus finds application where speech signals, such as signals corresponding to a vocal musical performance, are replaced by further speech signals. In particular, if the prerecorded stereophonic signals include stereo signal components corresponding to musical sounds generated by musical instruments, such as an orchestra, and voice signals corresponding to the spoken lyrics of a song, as sung by a performer, the voice changer apparatus permits an operator thereof to substitute his singing for the prerecorded singing while processing the stereo signal components. Hence, the prerecorded instrumental sounds, as by the orchestra, are processed and can be used to accompany the vocal utterances of the operator.

The ability to replace a prerecorded vocal performance with the singing of an operator has resulted in the use of such voice changer apparatus as a teaching instrument. Voice training is readily obtained, and the apparatus can be adapted to derive an improvement in singing technique.

However, it has been found that beneficial use of voice changer apparatus is attained if the vocal performance by the operator can be compared with the original, prerecorded performance. Stated otherwise, it is desirable for one, such as an operator, to be able to simultaneously listen to the original vocal performance, as prerecorded, with the vocal performance corresponding to the operator's singing. Unfortunately, the typical prior art voice changer apparatus does not have the capability of reproducing simultaneously the original performance and the substitute performance so that an audible comparison can be made. Hence, the prior art apparatus cannot be fully exploited to achieve the most favorable results.

OBJECTS OF THE INVENTION

Therefore, it is an object of the present invention to provide improved recording and reproducing apparatus wherein original voice signals can be replaced by further voice signals, the original and further signals being adapted for simultaneous comparison.

It is another object of this invention to provide improved voice changer apparatus wherein an original vocal performance can be replaced by an operator's vocal performance.

Yet another object of the present invention is to provide improved recording and reproducing apparatus wherein an original vocal rendition which is accompanied by an instrumental performance is processed such that the original vocal rendition is replaced by a further vocal rendition derived from an operator.

An additional object of this invention is to provide improved recording and reproducing apparatus wherein only voice signals are extracted from an original combination of voice signals accompanied by music signals.

A still further object of this invention is to provide improved recording and reproducing apparatus wherein original stereo signal components including a monaural signal component are recorded and wherein such original stereo signal components are processed so as to replace the original monaural component with a further monaural component and the processed stereo signal components together with the further monaural component also are recorded.

Another object of this invention is to provide improved apparatus wherein an original musical performance, consisting of a vocal performance and an instrumental performance, together with a modified musical performance, having a substituted vocal performance are simultaneously recorded and are simultaneously reproduced.

Various other objects and advantages of the present invention will become clear from the ensuing detailed description of a preferred embodiment thereof, and the novel features will be particularly pointed out in the appended claims.

SUMMARY OF THE INVENTION

In accordance with the present invention, recording and reproducing apparatus are provided including signal processing apparatus for replacing the supplied monaural signal component included in original stereo components with a further monaural signal component; a first recording head for recording the processed stereo signal components including the further monaural signal component; a second recording head for recording the original stereo signal components including the supplied monaural signal component; a reproducing device for reproducing the recorded stereo signal components including both the supplied and further monaural signal components; and a sound generator for generating sounds corresponding to the respective reproduced signals.

BRIEF DESCRIPTION OF THE DRAWINGS

The following description of a preferred embodiment will best be understood in conjunction with the accompanying drawing which is a partial block, partial schematic illustration of one embodiment of recording and reproducing apparatus in accordance with the teachings of the present invention.

DETAILED DESCRIPTION OF A CERTAIN PREFERRED EMBODIMENT

Referring now to the drawings, there is illustrated in partial schematic, partial block form, a preferred embodiment of recording and reproducing apparatus for recording processed signals on a record medium and for reproducing audible sounds in response thereto. In particular, the recording apparatus is comprised of a signal processing circuit including amplifiers 2 and 7 and adder circuit 12. This signal processing circuit is adapted to receive stereophonic signal components including a monaural signal component therein and to eleminate such monaural signal component from the stereo signal components. Accordingly, a first amplifier 2 includes an input terminal 1; and the other amplifier 7 includes an input terminal 6. Input terminal 1 is adapted to receive, for example, the right component R of a stereo signal. Similarly, the input terminal 6 is adapted to receive the left component L of a stereo signal. The source of such stereo signal components forms no part of the present invention per se and, as is recognized, may comprise prerecorded signals derived from any conventional record medium, such as phonograph discs, magnetic tape, or the like. Alternatively, such stereo signal components can be supplied to the left and right signal input terminals by conventional broadcast and radio reception techniques.

For the present discussion it will be assumed that the supplied stereo signals are derived from a musical performance and thus include signals corresponding to the musical sounds generated by musical instruments, together with signals corresponding to speech signals as might be produced by a vocal performance. It is recognized by those of ordinary skill in the art that the right and left signals derived from an instrumental performance differ in phase and/or frequency. Hence, these signals contribute to the stereophonic sound effects that are obtained during signal reproduction. However, right and left speech signals that are derived from a vocal performance are substantially the same in both frequency and phase. Consequently, such speech signals are herein referred to as the monaural signal component. It should thus be appreciated that the right input terminal 1 is supplied with the right channel stereo signal components, including the aforenoted monaural signal component, and the left input terminal 6 is supplied with the left channel stereo signal components, including such monaural signal component. The monaural signal components supplied to the left and right input terminals, i.e., the supplied speech signals corresponding to a vocal performance, are substantially equal in frequency and phase.

For purposes of illustration, the right channel amplifier 2 is comprised of an amplifying transistor $Q_1$ having its base electrode connected to the right input terminal 1, its collector electrode connected to a source of operating potential +B via a load resistor 3 and its emitter coupled to a reference potential, such as ground, via emitter resistor 5. This amplifying transistor is adapted to operate as an emitter-follower. Of course, the schematic representation of the right channel amplifier 2 is merely illustrative and other alternative embodiments can be readily used.

The left channel amplifier 7 is similar and is seen to include an amplifying transistor $Q_2$ having its base electrode connected to the left input terminal 6, its collector electrode coupled to the source of operating potential +B via load resistor 8 and its emitter electrode coupled to a reference potential, such as ground, by an emitter resistor 10. The amplifying transistor $Q_2$ is adapted to operate as an emitter-follower and, alternatively, as an inverting amplifier, such as in common-emitter configuration. Accordingly, the left channel amplifier 7 includes first and second output terminals. The first output terminal is coupled to the collector electrode of the amplifying transistor $Q_2$ and is coupled to a fixed contact $b$ of a change-over switch $SW_1$. The second output terminal is coupled, via resistor 9, to the emitter electrode of the amplifying transistor $Q_2$ and is connected to the fixed contact $c$ of the change-over switch. The change-over switch $SW_1$ further includes a movable contact $a$ which is adapted to selectively engage either of its fixed contacts $b$, $c$, and is connected to the adding circuit 12. It should be apparent that the illustrated change-over switch is merely representative and any conventional switching devices that are adapted to perform the change-over switching function, as soon to be described, can be used.

The adding circuit 12 is a conventional analog adding device and includes a further input adapted to be supplied with signals derived from the right channel amplifier 2. Accordingly, the output terminal of the right channel amplifier is coupled via resistor 4 to the emitter electrode of the amplifying transistor $Q_1$ and is connected to an input of an adding circuit 11. The adding circuits 11 and 12 are substantially similar and, as is illustrated, the output of the adding circuit 11 is connected to the remaining input of the adding circuit 12. A further input of the adding circuit 11 is connected to a transducer M so as to be provided with electrical signals derived from vocal sounds. Accordingly, the transducer M comprises a conventional microphone for converting speech to corresponding electrical manifestations which are, in turn, supplied to the adding circuit 11.

Yet another adding circuit 13 is provided for receiving the signals supplied to the output terminal of the right channel amplifier 2 and the signals supplied to the second output terminal of the left channel amplifier 7.

The adding circuits 12 and 13 are connected to amplifiers 14 and 15, respectively. These respective amplifiers are, in turn, connected to recording devices $H_1$ and $H_2$. Preferably, such recording devices are formed of conventional magnetic recording heads for recording the respective signals supplied thereto on a magnetic medium, such as magnetic tape T. The magnetic recording heads $H_1$ and $H_2$ are arranged to record signals in individual tracks on the record medium.

Before describing the operation of the recording apparatus, the reproducing apparatus will be described. As is apparent, the reproducing apparatus is adapted to reproduce signals previously recorded on the record medium and to derive audible sounds in response thereto. Accordingly, playback heads $H_3$ and $H_4$ are provided to reproduce the signals previously recorded in individual tracks. For the embodiment wherein the record medium comprises a magnetic tape T, the playback heads $H_3$ and $H_4$ comprise conventional magnetic reproducing heads. As is recognized by those of ordinary skill in the art, the recording and reproducing function of a magnetic head can be combined in a single device, whereby the playback heads $H_3$ and $H_4$ can be included in the aforenoted heads $H_1$ and $H_2$, respectively.

The respective playback heads are connected to respective pre-amplifiers 17 and 18 which, in turn, are coupled to respective change-over switches $SW_2$ and $SW_3$.

Each of the change-over switches $SW_2$ and $SW_3$ is similar to the aforedescribed change-over switch $SW_1$ and, as is illustrated, each includes first and second fixed contacts and a movable contact selectively engagable with one of the fixed contacts. In particular, the change-over switch $SW_2$ includes a fixed contact $c$ connected to the pre-amplifier 17. A movable contact $a$ is selectively engagable with the fixed contact $c$ and is connected through an amplifier 19 to an electroacoustic transducer 21. As is recognized, an electroacoustic transducer is adapted to convert electrical signals into corresponding sounds. Accordingly, the electroacoustic transducer 21 may comprise a conventional loud speaker system, ear phones, head-phones, and the like.

The movable contact $a$ of the change-over switch $SW_2$ is additionally connected to the fixed contact $b$ of the change-over switch $SW_3$. This change-over switch includes a further fixed contact c which is connected to the pre-amplifier 18. The movable contact a of the change-over switch $SW_3$ is selectively engagable with either of its fixed contacts b, c and is connected through the amplifier 20 to the electroacoustic transducer 22. This latter electroacoustic transducer is substantially similar to the aforedescribed electroacoustic transducer 21.

As is further shown, the fixed contact b of the change-over switch $SW_2$ is connected with the amplifier 14 by a further amplifier 16. As will soon be described, this further connection of the change-over switch $SW_2$ permits the simultaneous audible monitoring of signals as such signals are recorded on the record medium.

The operation of the illustrated recording and reproducing apparatus exhibiting the voice-changing capabilities will now be described. The right and left channel components of the stereo signals, including the monaural signal component, are applied to the right and left input terminals 1 and 6, respectively. It may be assumed that the right and left channel components are substantially in phase. Accordingly, after suitable amplification, the right channel component, including the monaural signal component which, for example, is a voice signal corresponding to a vocal performance, is produced at the output terminal of the amplifier 2 and is supplied to the respective adding circuits 11 and 13. Similarly, the left channel stereo signal component, including the monaural vocal signal component, is amplified by the left channel amplifier 7. As is appreciated, the resultant amplified signal produced at the collector electrode of the amplifying transistor $Q_2$ is supplied to the first output terminal of the amplifier 7 and is inverted in phase. Hence, this first output terminal can be considered to be the inverting output terminal of the left channel amplifier 7. Also, the amplified signal provided at the emitter electrode of the amplifying transistor $Q_2$ is applied to the second output terminal of the amplifier 7 and is seen to exhibit a non-inverted phase. Hence, this second output terminal can be considered to be a non-inverting output terminal of the left channel amplifier 7.

The adding circuit 13 is supplied with the amplified right channel stereo signal component and the amplified left channel stereo signal component at its respective inputs. As is fully appreciated, the amplified monaural vocal signal included in the stereo signal components is also applied in adding relationship to the adding circuit 13. The resultant output signal produced by this adding circuit is seen to be the sum of the right and left channel stereo components, including the monaural signal component, which may be represented as R+L. Thus, it is appreciated that the adding circuit 13 acts to change the stereo signal to a monaural signal. The changed stereo signal produced by the adding circuit also includes the originally supplied monaural vocal signal component.

Let it be assumed that the change-over switch $SW_1$ is operated whereby the movable contact a thereof is in engagment with the fixed contact b. Consequently, the adding circuit 12 is supplied with the amplified right channel stereo signal component, including the original monaural signal component, and the phase-inverted left channel stereo signal component derived at the phase inverting output terminal of the left channel amplifier 7. This phase-inverted stereo signal component also includes the phase-inverted monaural vocal signal component. The adding circuit 12 thus produces the stereo signal components R—L. In addition, the monaural signal components applied to the adding circuit 12 are seen to be applied thereto in phase cancelling relation. That is, these monaural signal components, although initially admitting of substantially the same frequency and phase, are now out-of-phase with each other. Hence, the original monaural signal component that was included in the stereo signal components has now been removed, and the stereo signal components produced by the adding circuit 12 now merely correspond to the musical instrumental performance. That is, once the vocal signals have been eliminated, the resultant stereo signal components merely represent the musical accompaniment.

Now, if the microphone M is operated by an operator to thereby generate electrical manifestations of the operator's speech, such generated vocal signals are supplied to the adding circuit 11. Such vocal signals are seen to correspond to a further monaural signal component and are combined with the amplified right channel stereo component in the adding circuit 11 and then further combined with the resultant stereo signal components produced by the adding circuit 12. Hence, at the output of the adding circuit 12, which is the output of the signal processing circuit 25, the original monaural signal component included in the original stereo signal components is replaced by the further monaural signal component derived from the operator's speech. Stated otherwise, the voice signals originally received at the input terminals 1 and 6 are changed to the voice signals derived at the microphone M. Consequently the original singer's performance is here electrically replaced with the operator's performance.

The resultant stereophonic signal components including the further monaural signal component as derived from the microphone M, which is produced by the adding circuit 12, is supplied through the amplifier 14 to the recording head $H_1$. Simultaneously therewith, the added right and left channel stereo signal components produced by the adding circuit 13, and including the original monaural signal component, are supplied through the amplifier 15 to the recording head $H_2$. The signals supplied to the respective recording heads are recorded in individual tracks on the record medium. Thus, signals representing the voice-changed performance are recorded by the recording head $H_1$ simultaneously with the recording by the recording head $H_2$ of the signals representing the original performance.

It is appreciated that, if the movable contact a of the change-over switch $SW_2$ is operated to engage its fixed contact b, the voice-changed stereo signals are additionally supplied by the amplifier 14 through the pre-amplifier 16 to the electroacoustic transducer 21 via the amplifier 19. Hence, the voice-changed performance can be monitored simultaneously with the recording thereof. That is, the substituted monaural vocal signal component included in the stereo signal components R—L are converted to corresponding sounds by the electroacoustic transducer 21 as such signals are recorded.

If the change-over switch $SW_1$ had been operated whereby the movable contact a is in engagment with the fixed contact c, the non-inverted left channel stereo signal component, including the original monaural signal component, would be supplied from the non-inverting output terminal of the left channel amplifier 7 to the adding circuit 12. Adding circuit 12 would then produce an output signal R+L which is substantially similar to the output signal produced by the adding circuit 13. Hence, with this operation of the change-over switch $SW_1$, the original monaural vocal signal would not be removed from the stereo signal components. Consequently, the aforedescribed voice-changing function would not be performed.

Now, during reproduction, the signals recorded in the respective tracks on the record medium are reproduced by the respective reproducing heads $H_3$ and $H_4$. The reproducing head $H_3$ reproduces the voice-changed signals comprised of the stereo signal components R—L, and including the substituted monaural signal component derived from the microphone M. The reproducing head $H_4$ reproduces the stereo signal components R+L and including the original monaural signal component. These respective reproduced signals are supplied, by the preamplifiers 17 and 18, to the fixed contacts $c$ of the changeover switches $SW_2$ and $SW_3$, respectively.

If the change-over switches are operated such that each movable contact $a$ is in engagement with its fixed contact $c$, the reproduced signals are coupled through the amplifiers 19 and 20 to the electroacoustic transducers 21 and 22, respectively. Accordingly, the voice-changed musical performance is reproduced by the transducer 21, whereas the original performance is substantially reproduced by the transducer 22. In this manner, the operator's rendition of a vocal performance can be simultaneously audibly compared with the original vocal performance. If the change-over switch $SW_3$ is operated such that the movable contact $a$ is in engagment with the fixed contact $b$, it is appreciated that both the electroacoustic transducers 21 and 22 are supplied with the voice-changed signals and thus reproduce the voice-changed vocal performance.

In typical applications of the aforedescribed apparatus, the performance of an operator's song can be compared with the performance of an original song with instrumental accompaniment for both. Such audible comparison can be avoided merely by the suitable operation of the change-over switch $SW_3$, whereby the voice-changed performance will be reproduced by both transducers 21 and 22. Thus, the apparatus in accordance with the present invention is seen to be readily adapted for use as a teaching aide whereby a vocal performance can be readily improved and an operator's singing technique can be advanced.

In one embodiment of the aforedescribed apparatus, signals corresponding to the musical instrumentation accompaniment can be deleted from the composite stereo signals such that only the speech signals, or vocal arrangment, can be reproduced. In this embodiment a band pass filter 26 is provided in, for example, the circuit interconnecting the adding circuit 13 with the recording head $H_2$. This filter has a band pass range corresponding to the frequency range of speech signals. In particular, the band pass filter 26 admits of a frequency pass band from about several Hz to 15 KHz. Since the signals R+L, and including the original monaural signal component, produced by the adding circuit 13 include frequencies derived from musical instruments, which frequencies are above the pass band of the filter 26, such higher frequencies will not be transmitted to the recording head $H_2$. Consequently, only the vocal frequencies representing a vocal arrangement in the absence of musical accompaniment will be recorded on the record medium. During reproduction, this monaural signal component is reproduced by the reproducing head $H_4$ and, if the change-over switch $SW_3$ interconnects the reproducing head with the transducer 22, the original vocal rendition will be reproduced in the absence of musical accompaniment.

Similarly, if the band pass filter 26 is inserted in the circuit which connects the adding circuit 12 and the recording head $H_1$, the further monaural signal component provided by the microphone M will be recorded on the record medium but the signals corresponding to the instrumental accompaniment, and included in the stereo signal components R—L, will be removed. Thus, the operator's vocal rendition will be recorded but the musical accompaniment therefor, as produced at the output of the adding circuit 12, will be removed. Thus, only the operator's singing voice is reproduced by the transducer 21 when the change-over switch $SW_2$ is operated to interconnect the preamplifier 16 with the transducer. Also, during signal reproduction, the operator's singing voice, in the absence of musical accompaniment, will be reproduced by the transducer 21 when the change-over switch $SW_2$ is operated to interconnect the preamplifier 17 with the transducer. Furthermore, and as is recognized, the operator's voice, without musical accompanyment, will be reproduced by both transducers 21 and 22 when the change-over switch $SW_2$ is operated to connect the preamplifier 17 with the transducer 21 and when the changeover switch $SW_3$ is operated to connect the preamplifier 17 with the transducer 22.

While the invention has been particularly shown and described with reference to a certain preferred embodiment thereof, it will be obvious to those skilled in the art that various changes and modifications in form and details may be made without departing from the spirit and scope of the invention. For example, the illustrated right and left channel amplifiers can be readily interchanged. Furthermore, it should be appreciated that the structure of the amplifiers 2 and 7, as shown herein, is merely illustrative. Various additional components can be provided, in conventional manner, to comprise the respective amplifying circuits. It is, therefore, intended that the appended claims be interpreted as including the foregoing and other such changes and modifications.

What is claimed is:

1. Recording and reproducing apparatus comprising:
   means for supplying stereo signal components including a monaural signal component;
   signal processing means for replacing said supplied monaural signal component included in said stereo signal components with a further monaural signal component;
   first recording means for recording said processed stereo signal components including said further monaural signal component;
   second recording means for recording said supplied stereo signal components including said supplied monaural signal component;
   reproducing means for reproducing the recorded stereo signal components including said further monaural signal component and the recorded stereo signal components including said supplied monaural signal component; and
   sound generating means coupled to said reproducing means for generating sounds corresponding to said respective reproduced signals.

2. Recording and reproducing apparatus in accordance with claim 1 wherein said sound generating means comprises a first electroacoustic transducer for generating sounds corresponding to the stereo signal components including said further monaural signal component; and a second electroacoustic transducer for generating sounds corresponding to the stereo signal components including said supplied monaural signal component.

3. Recording and reproducing apparatus in accordance with claim 2 wherein said reproducing means comprises first reproducing means for reproducing the recorded stereo signal components including said further monaural signal component; and second reproducing means for reproducing the recorded stereo signal components including said supplied monaural signal component.

4. Recording and reproducing apparatus in accordance with claim 3 comprising first switch means included in a first circuit for connecting said first reproducing means with said first electroacoustic transducer; and second switch means included in a second circuit for connecting said second reproducing means with said second electroacoustic transducer; said first and second switch means being selectively operable such that the signals reproduced by said first and second reproducing means are supplied to said first and second electroacoustic transducers, respectively, and the signals reproduced by said first reproducing means are supplied to both said first and second electroacoustic transducers.

5. Recording and reproducing apparatus in accordance with claim 4 wherein one of said first and second switch means is further operable to selectively couple an associated one of said first and second electroacoustic transducers to said signal processing means such that said selectively coupled electroacoustic transducer is supplied with said processed stereo signal components including said further monaural signal.

6. Recording and reproducing apparatus in accordance with claim 1 wherein each of said first and second recording means comprises a magnetic recording head for recording signals on a respective track of a magnetic record medium; and wherein said reproducing means comprises first and second magnetic reproducing heads for reproducing signals from respective tracks on said magnetic record medium.

7. Recording and reproducing apparatus in accordance with claim 1 wherein said signal processing means comprises combining means for combining a first stereo signal component including said supplied monaural signal component with a second stereo signal component including said supplied monaural signal component in cancelling relation to thereby cancel said supplied monaural signal component; and means for inserting said further monaural signal component to said combined stereo signal components.

8. Recording and reproducing apparatus in accordance with claim 7 wherein said signal processing means further comprises phase inverting means for inverting the phase of one of said first and second stereo signal components including said supplied monaural signal component, the phase-inverted signal components being supplied to said combining means together with the non-phase-inverted signal components.

9. Recording and reproducing apparatus in accordance with claim 8 further comprising second combining means for combining said first stereo signal component including said supplied monaural signal component with said second stereo signal component including said supplied monaural signal component in noncancelling relation; the combined signals produced by said second combining means being coupled to said second recording means.

10. Recording and reproducing apparatus in accordance with claim 9 wherein said first-mentioned combining means and said second combining means comprise first and second adding means respectively.

11. Recording and reproducing apparatus in accordance with claim 10 further comprising first amplifying means for receiving said first stereo signal component including said supplied monaural signal component, said first amplifying means having an output terminal; and wherein said phase inverting means comprises second amplifying means for receiving said second stereo signal component including said supplied monaural signal component, said second amplifying means having a phase inverting output terminal and a non-inverting output terminal; said non-inverting output terminal and said first amplifying means output terminal being connected to said second adding means.

12. Recording and reproducing apparatus in accordance with claim 11 further comprising switch means for selectively connecting said inverting and non-inverting output terminals to said first adding means; said first adding means being further connected to said first amplifying means output terminal.

13. Recording and reproducing apparatus in accordance with claim 12 wherein said signal processing means further comprises transducer means for generating said further monaural signal component in response to a voice signal; said generated further monaural signal component being coupled to said first adding means.

14. Recording and reproducing apparatus in accordance with claim 1 wherein said supplied stereo signal components include components representing musical sounds; and said supplied and further monaural components represent speech sounds.

15. Recording and reproducing apparatus in accordance with claim 14 further comprising filter means coupled to one of said first and second recording means for removing those components representing musical sounds from the signals supplied thereto.

16. Voice changing apparatus for replacing the original voice signals included in combination with musical signals with further voice signals, comprising:
first means for supplying a first portion of said combined musical and original voice signals;
second means for supplying a second portion of said combined musical and original voice signals;
first combining means coupled to said first and second means for combining said first and second portions of signals in voice signal cancelling relation to thereby produce said first portion of musical signals in first combination with said second portion of musical signals;
voice signal generating means for generating said further voice signals;
inserting means coupled to said voice signal generating means for inserting said further voice signals into said first combination of first and second portions of musical signals;
second combining means coupled to said first and second means for combining said first and second portions of signals in a second combination, said second combination including said first and second portions of musical signals and said original voice signals;
a first electroacoustic transducer responsive to said first combination of musical signals including said inserted further voice signals for generating corresponding voice and music sounds; and
a second electroacoustic transducer responsive to said second combination of musical signals including said original voice signals for generating corresponding voice and music sounds.

17. Voice changing apparatus in accordance with claim 16 wherein said original voice signals included in said first and second portions of signals are of substantially the same frequency and phase and said musical signals included in said first and second portions of signals differ in frequency and phase; and wherein said first combining means combines one of said first and second portions of signals with a phase-inverted representation of the other of said first and second portions.

18. Voice changing apparatus in accordance with claim 17, and further comprising a record medium for recording the signals produced by said first and second combining means, respectively; a first recording head for receiving said first combination of musical signals including said inserted further voice signals and for recording same in a track on said record medium; a second recording head for receiving said second combination of musical signals including said original voice signals and for recording same in a separate track on said record medium; a first reproducing head for recovering signals recorded in said first-mentioned track and for supplying said recovered signals to said first electroacoustic transducer; and a second reproducing head for recovering signals recorded in said separate track and for supplying said recovered signals to said second electroacoustic transducer.

19. Voice changing apparatus in accordance with claim 18, further comprising first change-over switch means for selectively supplying to said first combining means said second portion of signals or a phase-inverted representation of said second portion of signals; second changeover switch means for selectively enabling the audible monitoring of said first combination of musical signals including said inserted further voice signals as said first combination is recorded or the sound reproduction of the recovered first combination of musical signals including said inserted further voice signals; and third change-over switch means for selectively enabling the audible comparison of said first combination of musical signals including said inserted further voice signals with said second combination of musical signals including said original voice signals.

20. Voice changing apparatus in accordance with claim 19 wherein said second means includes phase-inverting means for phase inverting said supplied second portion of said combined musical and original voice signals; said first combining means comprises adding means for adding said first portion of signals to said second portion of signals or said phase-inverted second portion of signals selectively supplied thereto; and said second combining means comprises adding means for adding said first and second portions of signals.

* * * * *